United States Patent [19]

Schulz et al.

[11] Patent Number: 4,485,399
[45] Date of Patent: Nov. 27, 1984

[54] METHOD AND APPARATUS APPROXIMATELY CORRECTING ERRORS IN A DIGITAL VIDEO SIGNAL

[75] Inventors: Axel Schulz, Bickenbach; Josef Sochor, Dieburg, both of Fed. Rep. of Germany

[73] Assignee: Robert Bosch GmbH, Stuttgart, Fed. Rep. of Germany

[21] Appl. No.: 357,619

[22] Filed: Mar. 12, 1982

[30] Foreign Application Priority Data

Apr. 9, 1981 [DE] Fed. Rep. of Germany ....... 3114275

[51] Int. Cl.$^3$ .......................... H04N 5/14; H04N 5/21
[52] U.S. Cl. ...................................... 358/36; 358/167; 358/280; 358/314
[58] Field of Search ...................... 358/36, 37, 39, 163, 358/160, 166, 169, 167, 284, 280, 162, 314

[56] References Cited

U.S. PATENT DOCUMENTS

| | | | |
|---|---|---|---|
| 4,213,150 | 6/1980 | Robinson | 358/166 |
| 4,220,972 | 9/1980 | Geokezas | 358/166 |
| 4,334,237 | 6/1982 | Reitmeier | 358/36 |
| 4,395,729 | 7/1983 | Lewis | 358/36 |
| 4,398,210 | 8/1983 | Liu | 358/36 |
| 4,399,454 | 8/1983 | Warnock | 358/36 |

FOREIGN PATENT DOCUMENTS 3097 10/1981 WO ......................................358/37

OTHER PUBLICATIONS

Digital Television Image Enhancement, by Johm Rossi, Journal of the SMPTE, vol. 84, Jul. 1975, pp. 545-551.
Publication "Digital Video Recording: Some Experiments in Error Protection", by C. D. Mathers, M.Sc., in BBC Research Report, Feb. 1976 issue, pp. 1-4.

Primary Examiner—Tommy P. Chin
Attorney, Agent, or Firm—Frishauf, Holtz, Goodman & Woodward

[57] ABSTRACT

Picture points represented by a digital signal that is found to be in error are set to zero (black) value. Incoming 8-bit signals are twice delayed by one line delays, and 8-bit shift registers are provided for the undelayed, once delayed and twice delayed signals, each shift register providing three places for successive picture points. Averages are continuously formed horizontally, vertically and on both diagonals about every picture point, and when one value which is averaged is faulty, the divider at the output of the addition stage has its divisor changed from 2 to 1. The averages themselves are averaged to eliminate averages that are unusable because both inputs are faulty. The color television signal must be separately coded for the color and luminance information, and essentially the same scheme may be used for covering over errors in the color information as in the luminance information.

3 Claims, 5 Drawing Figures

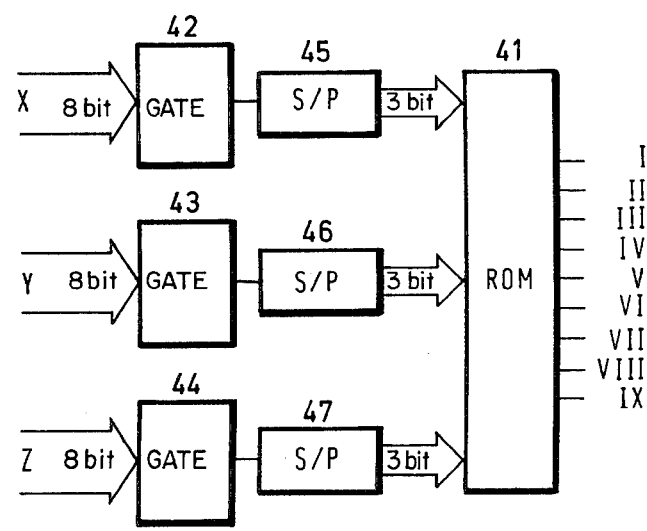

METHOD AND APPARATUS APPROXIMATELY CORRECTING ERRORS IN A DIGITAL VIDEO SIGNAL

This invention concerns a method and apparatus for covering over or making invisible errors that are detected in a digital video signal by substituting for an erroneous light value a light value obtained by averaging light values of neighboring picture points.

One method for concealing errors of video signals is known from the periodical "BBC Research Report" 1976/1, Feb. 76, pp. 1-4. This known method applies to errors in a digital color television signal encoded in a so-called closed code and involves utilizing only picture points disposed horizontally with respect to the picture point lost by error for the derivation of a picture point value to be substituted for the lost one. A further disadvantage of the method there disclosed is that no symmetrical approximation of the values of neighboring picture points is possible. Furthermore, errors are involved relative to a digital video signal under processing that involves a very high data rate, about 100 megabit/second, which means that the errors must be handled by very fast circuits with critical timing.

THE INVENTION

It is an object of the invention to provide a more effective method of covering over errors in a digital color television signal by using averages of the values of said signal at neighboring picture points and one that can be operated at reasonable circuit speeds.

Briefly, the invention is applicable with respect to color television signals that are encoded separately with respect to the color information and the luminance information, hereinafter referred to as a separately coded color television signal. Averages are made for both of the components. More particularly, shift registers are provided for storing the video signals as they come, with a one line delay and with a two line delay, in order to make possible averaging vertically and diagonally, as well as horizontally.

The invention has the advantages that the method is applicable without changes in principle both for processing the digital luminance components and for processing the digital color components of a separately coded color television signal. All problems regarding the time lapse within the components involved in a necessary approximation change now disappear when two neighboring points involve errors.

There is also the particular advantage that the symmetrical structure of the circuits regarding their control lends itself well to particularly simple circuitry.

THE DRAWINGS

The invention is further described by way of illustrative example with reference to the annexed drawings, in which:

FIG. 2b is a block circuit diagram of a circuit in accordance with the invention utilizing the circuitry of FIG. 2a;

FIG. 4 is a basic block diagram for obtaining the control signals for the circuit of FIG. 2.

DESCRIPTION OF THE ILLUSTRATED EMBODIMENT

Figure 1:
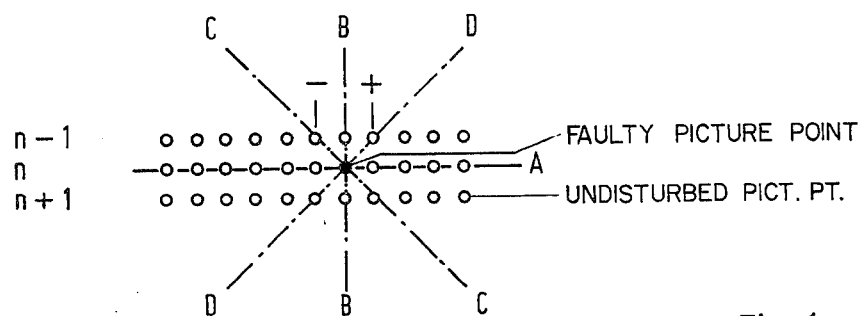
FIG. 1 is a diagram of a faulty picture point and neighboring picture points as arranged on a viewing tube.

In a disturbed section of a picture, as schematically represented in FIG. 1, the line containing the faulty picture point is designated n, the preceding one n−1 and the following one n+1. A number of reference lines are drawin in FIG. 1 through the single faulty picture point which is distinguished by being a solid black point, while the undisturbed picture points are open circles. The reference line A—A runs in the horizontal scanning direction, the reference line B—B perpendicularly thereto, the reference line C—C on the "bardexter" ("right") diagonal and the reference line D—D on the "barsinister" ("left") diagonal. The picture points lying before the reference line B—B in the horizontal scanning direction, in the neighborhood of the faulty point are designated with "−", those lying after the reference line B—B in the horizontal scanning direction are designated with the symbol "+". The various picture points in the neighborhood of an immediately adjoining faulty picture point are defined in their relation to the faulty picture point, in each case by two components: by their position on the line of the faulty point (n), or the preceding line (n−1), or the following line (n+1) and, in the second place, by their position immediately above or below the faulty point (reference line B—B), or ahead of it (−), or after it (+). In another manner of counting, the definition of the position of a particular undisturbed picture point relative to the faulty point can also be made by means of the reference line star (A—A,-B—B,C—C,D—D) in connection with the line designation (n−1,n,n+1).

Figure 2A:
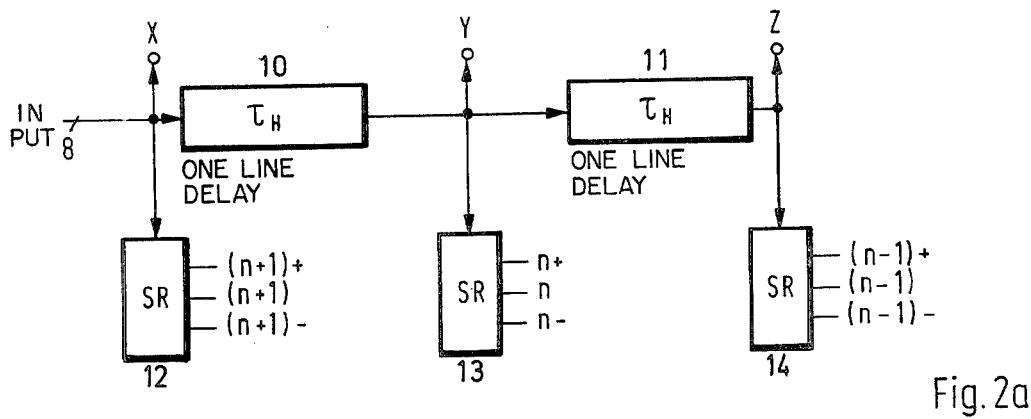
FIG. 2a is a basic block diagram of circuitry utilized in the practice of the invention.
Figure 2B:
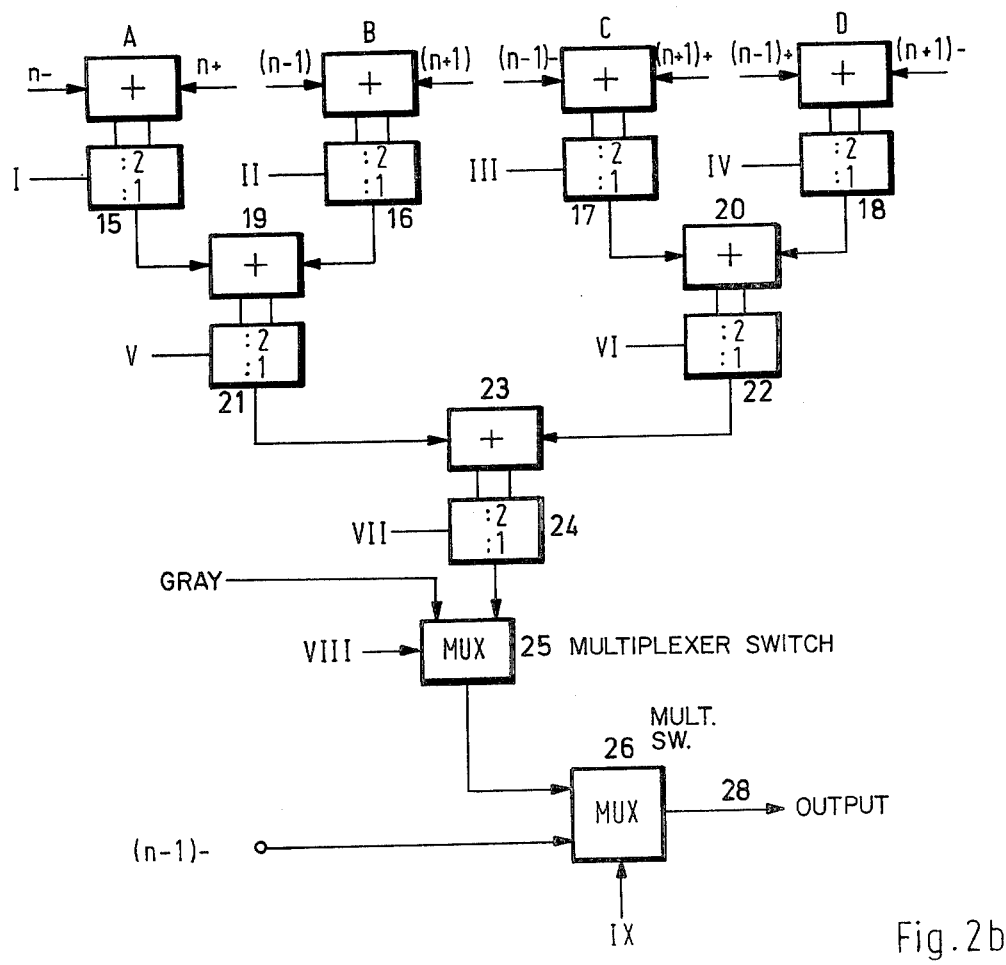

FIG. 2a shows how substitute signals can be provided for insertion at a picture point in case the signal for that picture point is subject to an error, and FIG. 2b shows, likewise in block diagram, a circuit for formation of a substitute signal and for its addition to the digital video signal to provide the most complete covering over of the error that is possible. The addition process is simple, because the commonly used error detection substitutes a zero (full black) value for a signal found to have an error.

In FIG. 2a, a video signal receiving on an 8-bit parallel bus in a serial data stream proceeds successively through two delay devices 10 and 11, in each of which the signal is delayed by the duration of a television line. All the digital video signals present in the X plane thus belong to one picture line, the one which is designated n+1 in FIG. 1; all digital signals in the Y plane are delayed by the duration of one line, and accordingly belong to line n, and the signals present in the Z plane are delayed once more by the duration of a line, and accordingly belong to the picture line n−1. Reference is made here to "planes", so that it is easier to imagine eight bits proceeding from left to right aligned in the line of sight when looking at the drawing.

The digital signals of the X plane are supplied to a shift register 12, the three outputs of which always contain signals with a time difference between them of one picture point interval. Since the digital video signals of the X plane belong to line n+1, the signal taken from the first output of the shift register 12 represents the picture point in [(n+1)+], the signal taken from the second output of the shift register 12 represents the picture point (n+1), and the signal taken from the third output of the shift register 12 represents the picture point [(n+1)−]. In a similar manner, the digital video signals of the Y plane are supplied to a second shift register 13, from the outputs of which the picture points (n+),n,(n−) are available. Finally, the digital video signals of the Z plane are supplied to a third shift register 14, and the shift registers are shift register arrays, of course (so that all eight bits of each picture point are available), at the outputs of which three succeeding picture points of the line n+1 following the current picture line are available, respectively designated [(n−1)+], n−1, [(n−1)−]. The signals at the outputs of the shift register devices 12,13 and 14 thus provide the current picture point n, as well as the immediately adjacent picture points of its neighborhood, including those of the preceding and of the following line shown in FIG. 1.

In the circuit of FIG. 2b, four addition stages are provided, respectively corresponding to the reference lines A—A,B—B,C—C and D—D passing through the current picture point, for use when the current picture point is faulty. These addition stages are correspondingly designated A,B,C and D. According to the course of the reference line shown in FIG. 1, the appropriate signals at the outputs of the shift register 12,13,14 (which have all been identified above with reference to FIG. 1) are supplied to the inputs of the addition stages A,B,C and D. In consequence, there are present at respective inputs of an addition stage A the signals of the picture points (n−) and (n+), of respective inputs of an addition stage B the signals of the picture points (n−1) and (n+1), at respective inputs of an addition stage C the signals of the picture points [(n−1)−] and [(n+1)+] and at respective inputs of an addition stage D the signals of the picture points [(n−1)+] and [(n+1)−]. Each of the addition stages A,B,C and D has a division stage following it, the devisor ratio of which is variable by the factor 2 according to control. If for example in the addition stage A a substitute signal along the reference line A—A is formed of the signals (n−) and (n+), there result results at the output of the digital addition stage A a signal that for equal content value of the two picture points brought in to form a substitute, has a digital value that is too high by the factor of 2. Consequently, in the following divider stage 15, division by the divisor 2 takes place, so that the signal at the output of this dividing stage has a digital value which is the mean between the input signals of the addition stage A.

Detection of faulty picture points in digital color television signals is performed in an error detector not shown here or described, but known in the art and forming no part of this invention, so that it does not need to be described here. If a picture point is recognized as faulty by the error detector, the value of the faulty picture point is set to zero by the error detector. At the same time in the illustrated example, the value zero of the digital color television signal subdivided into $2^8$ value steps is produced as identification for the presence of a faulty picture point. The digital color television signal is thereby reduced by one value step. If this diminution of the value region in the digital color television signal should not be permitted, the presence of faulty picture points in the digital color television signal can also be indicated over a separate signal conductor.

In the cases in which only one undisturbed digital input signal is provided to an addition stage, while the signal then provided to the other input of the addition stage is faulty, and therefore has had its value set to zero, corresponding to the picture content "black", division by the factor 2 at the output would provide a substitute signal of a value that corresponds to half of that of a usable input signal. In this case, the divider stage 15 in a manner further described below, is switched over so that the division ratio (divisor) is changed from 2 to 1, i.e., the one usable signal runs through the divider stage unchanged, and at the output there appears a digital value that corresponds to that input signal.

In the same way, the switchable divider 16 follows the addition stage B, the switchable divider 17 the addition stage C, and the switchable divider 18 the addition stage D. The outputs of every two divider circuits 15 and 16, 17 and 18, are supplied to a further addition stage, and the signals of the divider stages 15 and 16 thus go to the addition stage 19, those of the addition stages 17 and 18 to the addition stage 20. In the addition stages, the incoming digital signals are added once more, and when two usable signals are provided, at the output of the addition stage 20, the signal is reduced by half by the switchable divider 22. If, however, it is determined that by an extended disturbance both inputs of one of the addition stages A,B,C and D are disturbed so that no usable substitution signal is delivered, the corresponding dividing stage 21 or 22 is switched to the ratio 1, so that the output of these dividers corresponds to the output signal of one of the divider stages 15,16,17 or 18. The outputs of the two divider stages 21 and 22 are again connected to the inputs of an addition stage, the addition stage 23 in this case, which again provides its output to a divider stage 24 with a switchable division ratio.

A multiplexer 25 follows the division stage 24 and has one input connected to the output of the division stage 24 and its other input is provided with a digital signal that corresponds to the gray value. In case of necessity, for example when the continually performed addition and division of the digital signals of the picture points in the neighborhood of a faulty picture point produces no usable result, the value "gray" can be put in as a substitution value. A connection leads from the outout of the multiplexer 25 to an input of another multiplexer 26, of which the other input contains a signal of the picture point (n−1)−. By the end of the time allowed for computation, a desired undisturbed picture point signal will have reached the (n−1)− output. The multiplexer 26 switches over between its two inputs for either concealing a faulty pictuure point or passing the video signal with undisturbed picture points. In this way, the resolution losses connected with the formation of average values are mitigated or suppressed. At the output 28 of the entire circuit arrangement shown in the drawing, the digital video signal in which its errors have been concealed, is made available for use.

Figure 3:
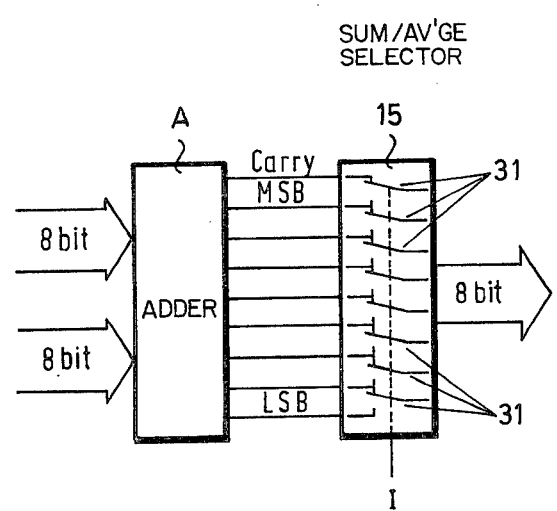
FIG. 3 is a circuit diagram constituting a detail of the block diagram of FIG. 2 for illustrating the obtaining of average values.

FIG. 3 shows a signal processing stage composed of an adder and a following divider corresponding to the description of FIG. 2b. By way of example, the addition stage A in combination with the divider 15 are shown. The input signals are supplied to the adder A serially in 8-bit parallel form. These are added in accordance to their values and transmitted to the divider 15. According to the control at the point I of the divider stage 15, switches 31 are controlled so that either a left or right shift takes place in the bit stream and a corresponding change of the division ratio from 1 to 2 or vice versa is produced.

Since in accordance with the invention, faulty picture point is ascribed the value zero, the gates 42–44 have a kind of AND function (namely output 1 when all inputs are 0); that provides a signal only when the presence of a faulty picture point is recognized. The time coordination follows a quasi 2-dimensional arrangement with the serial-parallel converters 45–47 which permits determination whether around a faulty picture point of which, if any, of the neighboring picture points are likewise faulty. The program content in the ROM 41 is then provided in such a way that the conditions described above are maintained with respect to the computation of substitution values with reference to the situation in the neighborhood of a faulty picture point.

The control of the dividers and multiplexers is produced as shown in FIG. 4 in accordance with conditions defined in a store (ROM 41). For this purpose, the signals of the X, Y and Z planes produce sequential signals at the gate 42, 43 and 44 outputs, as just described, which are then brought into 3-bit parallel form by the serial-parallel converters 45, 46 and 47 respectively serving the gates 42, 43 and 44. All nine bits are then supplied to a read-only memory 41. According to the programming of the ROM 41, the signals at the outputs I to VII are supplied for the control of the divider stages 15, 16, 17, 18, 21, 22 and 24, and the signals at the outputs VIII and IX are provided for the control of the multiplexers 25 and 26.

In the block circuit diagram of FIG. 2b, one channel for one of the components of a separately coded color television signal is represented. Each of the components of the color television signal requires a channel similarly constituted in accordance with the process of the present invention.

Although the invention has been described with reference to a particular illustrative example, it will be understood that modifications and variations are possible within the inventive concept.

We claim:

1. Method for concealing errors in a digital color television signal, in which faulty picture points are found by error detection methods and are replaced by information from neighboring picture points, said digital signal providing as input signals separately coded components of a color television signal, said method comprising the steps of:

subjecting each separately coded component to two successive delays of one television line and obtaining each of at least three successive picture point values at the beginning and end of these delays and at the connection between said two successive delays, by means of shift registers;

setting to zero the value of every picture point found to be faulty by error detection methods;

processing every picture point in turn as a reference picture point by forming average values about the reference picture point from the non-faulty picture point values neighboring said reference picture point, said average values being respectively formed by values of points aligned vertically, horizontally and on both diagonals with respect to said reference picture point, respectively;

averaging said average values to provide a substitution value, and substituting said substitution value for the value of the faulty picture point.

2. Apparatus for concealing errors in a digital color television signal for operation with other apparatus providing separately encoded color and luminance components of a color television signal in which each picture point value determined as faulty is set to zero, comprising:

means for successively delaying each of said signal components twice by a period corresponding to a television line;

shift register means for continuously providing at least three successive picture points before the first delay, after the first delay and after the second delay;

first stage addition means for adding picture points registered in said shift register means representing the two neighboring picture points of a reference picture point in each of the following four directions of display, horizontal, vertical and both diagonals, to produce respective addition results;

means for dividing the respective addition result by two to provide an average value, except when one of the picture point signals added is zero and for supplying the respective addition result without alteration when one of the added signals is zero;

second stage addition and dividing means for adding the divided addition results by pairs and for dividing each of the addition results by two to obtain an average, except when one of the divided addition values added is zero, in which case the second stage addition result value is provided unchanged;

third stage addition means and dividing means operating in the same manner as the second stage addition means and dividing means for the results of the second stage addition means and dividing means to produce a result signal; and means for substituting the result signal of the third stage addition means and dividing means for a picture point found to be faulty.

3. Method for concealing errors in a digital color television signal, in which faulty picture points are found by error detection methods and are replaced by information from neighboring picture points, said digital signal providing as input signals separately coded components of a color television signal, said method comprising the steps of:

subjecting each separately coded component to two successive delays of one television line and obtaining each of at least three successive picture point values at the beginning and end of these delays and at the connection between said two successive delays, by means of shift registers;

setting to zero the value of every picture point found to be faulty by said error detection methods;

forming first average values about every picture point from pairs of the neighboring picture point values respectively aligned vertically, horizontally and on both diagonals for every said pair of which neither picture point value is zero and forming sum values from those of said pairs including a zero point value, to produce thereby a set of first stage substituition values;

forming average values of non-overlapping pairs, of said first stage substitution values in which neither value of the pair is zero and forming sum values from those of said pairs of which includes a zero value, to produce thereby a set of second stage substitution values;

averaging said second stage substitution values provided neither of them is zero and, in other cases when said second stage addition values include a zero value, summing said second stage substitution values and thereby producing a third stage substitution value, and substituting said third stage substitution value for the value of said faulty picture point provided that said third stage substitution value is not zero and substituting a predetermined gray picture point value for the value of said faulty picture point whenever said third stage substitution value is zero.

* * * * *